United States Patent
Huang et al.

(10) Patent No.: US 11,082,341 B2
(45) Date of Patent: Aug. 3, 2021

(54) DATA PROCESSING

(71) Applicant: NEW H3C TECHNOLOGIES CO., LTD., Hangzhou (CN)

(72) Inventors: Liwei Huang, Beijing (CN); Wei Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/349,525

(22) PCT Filed: Nov. 10, 2017

(86) PCT No.: PCT/CN2017/110358
§ 371 (c)(1),
(2) Date: May 13, 2019

(87) PCT Pub. No.: WO2018/090872
PCT Pub. Date: May 24, 2018

(65) Prior Publication Data
US 2019/0349295 A1     Nov. 14, 2019

(30) Foreign Application Priority Data
Nov. 16, 2016  (CN) .......................... 201611033001.1

(51) Int. Cl.
*H04L 12/741* (2013.01)
*H04L 12/721* (2013.01)
*H04L 12/46* (2006.01)

(52) U.S. Cl.
CPC .............. *H04L 45/74* (2013.01); *H04L 45/66* (2013.01); *H04L 12/4641* (2013.01)

(58) Field of Classification Search
None
See application file for complete search history.

(56) References Cited

U.S. PATENT DOCUMENTS

2014/0092907 A1* 4/2014 Sridhar ................. H04L 12/413
370/392
2015/0124612 A1* 5/2015 Schlansker ........... H04L 47/808
370/235
2016/0028624 A1    1/2016 Song et al.

FOREIGN PATENT DOCUMENTS

CN          102970227          3/2013
CN          104092595          10/2014
(Continued)

OTHER PUBLICATIONS

Extended European Search Report issued in corresponding European Patent Application No. 17870707.1, dated Nov. 11, 2019.
(Continued)

*Primary Examiner* — Adnan Baig
(74) *Attorney, Agent, or Firm* — Norton Rose Fulbright US LLP

(57) ABSTRACT

Disclosed is a data processing method and a corresponding device. The method is applicable to a first edge device of a virtual extensible local area network, and comprises: receiving a target message, and determining a target network tag and a target destination address of the target message; determining a target outbound interface corresponding to the target message based on a result of matching the target network tag and the target destination address with a locally stored correspondence relationship of a network tag, a destination address and an outbound interface; sending the target message through the target outbound interface. In an example, a message is forwarded by matching a destination address and a network tag, avoiding forwarding a message as long as the destination address is hit and solving the problem that VMs with the same MAC address but belonging to different VLANs cannot gain access to one VXLAN.

13 Claims, 4 Drawing Sheets

(56) References Cited

FOREIGN PATENT DOCUMENTS

| | | |
|---|---|---|
| CN | 104954218 | 9/2015 |
| EP | 2890064 | 7/2015 |
| JP | 2016149701 | 8/1916 |
| JP | 2016152567 | 8/1916 |
| WO | WO 2015/144033 | 10/2015 |
| WO | WO-2015144033 A1 * 10/2015 | ......... H04L 12/4641 |

OTHER PUBLICATIONS

Office Action issued in corresponding Japanese Application No. 2019-523667, dated Mar. 10, 2020 (English Translation Provided).
International Search Report and Written Opinion issued in International Patent Application No. PCT/CN2017/110358, dated Jan. 26, 2018.
Office Action issued in Corresponding Japanese Application No. 2019-523667, dated Dec. 1, 2020 (English Translation provided).

* cited by examiner

DATA PROCESSING

CROSS-REFERENCE TO RELATED APPLICATIONS

The present application is a national phase under 35 U.S.C. § 371 of International Application No. PCT/CN2017/110358, filed Nov. 10, 2017, which claims priority to Chinese Patent Application No. 201611033001.1, filed with State Intellectual Property Office of PRC on Nov. 16, 2016, entitled "data processing method and device", each of which are incorporated herein by reference in their entirety.

BACKGROUND

With rapid development of network technology, a Virtual Extensible Local Area Network (VXLAN) is able to establish a large layer 2 network based on Internet Protocol (IP), to provide a layer 2 interconnection for distributed physical sites, and to provide service isolation for different tenants, thus resulting in an easier network deployment and maintenance.

DETAILED DESCRIPTION

Figure 1:
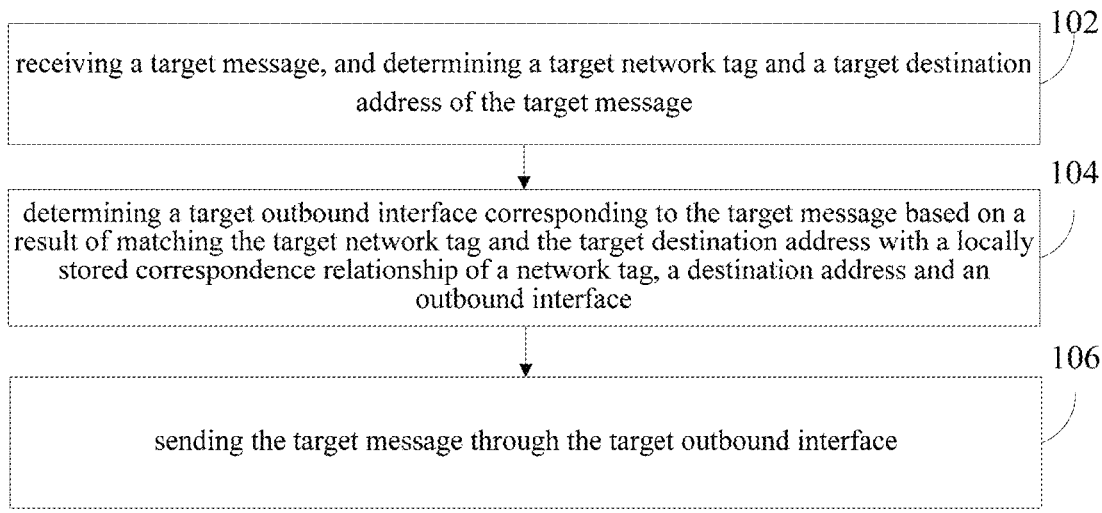
FIG. 1 is a flowchart of steps of a data processing method provided by an example of the present disclosure.

In order to make the above objectives, features and advantages of the present disclosure more apparent and easier to understand, the present disclosure will be described below in conjunction with the accompanying drawings and specific examples in more details.

The VXLAN technology takes an existing Layer 3 physical network as an Underlay network, and constructs a virtual Layer 2 network, i.e., an Overlay network, on it. Through encapsulation technology and by means of a Layer 3 forwarding path provided by the Underlay network, the Overlay network achieves the transmission of Layer 2 messages of tenants between different sites across the Layer 3 network. For tenants, the Underlay network is transparent, and the different sites of the same tenant are as if they were working in a local area network.

Ethernet Virtual Private Network (EVPN) inherits the advantages of VXLANs, and through Multiprotocol-Border Gateway Protocol (MP-BGP), EVPN can achieve the automatic discovery of VXLAN Tunnel End Points (VTEPs), automatic establishment of VXLAN tunnels, and automatic interconnection between VXLAN tunnels and a VXLAN without manual configuration by a user, reducing the difficulty of network deployment. Specifically, EVPN is a Layer 2 Virtual Private Network (VPN) technology, separating a control plane and a data plane, wherein, the control plane uses MP-BGP to notify EVPN routing information, and the data plane forwards VXLAN-encapsulated messages. When the physical sites of a tenant are spread out at different locations, EVPN can provide Layer 2 interconnection within the same subnet of the same tenant based on an existing service provider or enterprise IP network. Through an EVPN gateway, EVPN can provide Layer 3 interconnection between different subnets of the same tenant and with Layer 3 interconnection between the different subnets of the same tenant and an external network.

On a VTEP, a Virtual Switch Instance (VSI) for Layer 2 switching service is provided for a VXLAN. The VTEP can serve as a virtual switch for Layer 2 forwarding based on the VXLAN, and the VTEP has all the functions of a traditional Ethernet switch, including source MAC address learning, MAC address aging, flooding, etc. Wherein, the VSI can be in one-to-one correspondence with the VXLAN, and the VTEP can be an independent physical device, and can also be a server where a Virtual Machine (VM) is located. For example, multiple VMs can be created on one server, and different VMs can belong to different VXLANs. Wherein, VMs belonging to the same VXLAN are located in the same logical Layer 2 network, and are in Layer 2 interconnection with each other, and VMs belonging to different VXLANs are in Layer 2 isolation with each other.

Currently, the EVPN protocol defines that VXLAN forwarding is only performed according to MAC addresses. The inventor has discovered that the same VXLAN cannot be accessed at the same time if two or more VMs with the same MAC address belong to different VLANs respectively. Specifically, one VXLAN corresponds to a broadcast domain. When multiple VMs with the same MAC address but belonging to different VLANs respectively want to gain access to the same VXLAN, but edge devices of the VXLAN learn the MAC address of only one VLAN according to the existing EVPN protocol, i.e., it can support access by VMs of only one VLAN, this result in that VMs with the same MAC address but belonging to other VLANs are unable to gain access to the VXLAN.

In a Layer 2 network established based on an IP network, the relevant processing of a VXLAN is usually performed on a VTEP, i.e., an edge device of an IP core network needs to perform VXLAN processing, while network core devices only need to forward messages according to IP headers, reducing the difficulty and cost of network deployment. In examples of the present disclosure, a VTEP can be referred to as an edge device of a VXLAN, and a VM hanging under a VTEP can be referred to as a host.

One core concept of examples of the present disclosure is that an edge device of a VXLAN can achieve VXLAN forwarding based on a MAC address and a VLAN, thereby solving the problem that multiple VMs with the same MAC address but belonging to different VLANs cannot gain access to the same VXLAN. In examples of the present disclosure, an edge device that processes a received message can be referred to as a first edge device, and an edge device connected to the first edge device can be referred to as a second edge device. For example, an edge device that has established a neighboring relationship with the first edge device can be referred to as a second edge device.

Refer to FIG. 1, which is a flowchart of steps of a data processing method provided by an example of the present disclosure. The data processing method provided by the example of the present disclosure is applicable to a first edge device of a VXLAN, and can specifically comprise the following steps:

Block 102, receiving a target message, and determining a target network tag and a target destination address of the target message.

In an example, a message, such as a data message, a protocol message and other service messages, received by a first edge device is referred to as a target message. When the first edge device receives a target message, a target destination address carried in the target message may be obtained from this target message, and a target network tag corresponding to a VLAN to which the target message needs to access may be determined. Wherein, the target destination address may include a destination address that needs to be accessed, for example a host address, such as a MAC address and an IP address. The target network tag may be used to determine a VLAN that needs to be accessed, and may be specifically used to determine a VLAN that the target destination address belongs to, the target network tag may be for example a VLAN tag.

Block 104, determining a target outbound interface corresponding to the target message based on a result of matching the target network tag and the target destination address with a locally stored correspondence relationship of a network tag, a destination address and an outbound interface.

After determining the target destination address and the target network tag, the first edge device may conduct matching using the target destination address and the target network tag so as to determine the outbound interface based on the matching results. Specifically, the first edge device may store a correspondence relationship of a network tag, a destination address and an outbound interface locally in advance, such that it may obtain the locally stored correspondence relationship of a network tag, a destination address and an outbound interface when forwarding the target message subsequently, so as to match the target destination address carried in the target message with the destination address in the obtained correspondence relationship and match the target network tag corresponding to the target message with the network tag in the obtained correspondence relationship. When the target destination address matches the destination address in a correspondence relationship, and the target network tag matches the network tag in the correspondence relationship, i.e., in the case that the target destination address and the target network tag match the destination address and the network tag in a correspondence relationship respectively, the outbound interface recorded in the correspondence relationship may be taken as the target outbound interface of the target message.

Block 106, sending the target message through the target outbound interface.

After determining the target outbound interface, the first edge device may forward the target message out through the target outbound interface, so that the target message may access a host corresponding to the target destination address in a VLAN corresponding to the target network tag.

In an example, after receiving the target message, the first edge device of a VXLAN may match the target destination address and the target network tag carried in the target message with the destination address and a network tag in the locally stored correspondence relationship, so as to determine a target outbound interface and send the target message through the target outbound interface. That is, when a service message is received, the service message is forwarded by matching the destination address and the network tag, thus avoiding the prior situation in which the service message is forwarded as long as the destination address is hit, for example, the prior situation in VXLAN Layer 2 forwarding in which the service message is forwarded based on interfaces in a MAC table as long as the target destination address is hit, thereby solving the problem that multiple VMs with the same MAC address but belonging to different VLANs cannot gain access to the same VXLAN.

In an example, the first edge device may store a correspondence relationship of a network tag, a destination address and an outbound interface using an address forwarding table. Specifically, each forwarding table entry in the address forwarding table may be used for recording the destination address, the network tag and the outbound interface in each correspondence relationship. After determining the target network tag and the target destination address of a target message, the first edge device may search the address forwarding table for a forwarding table entry based on the target network tag and the target destination address. If a network tag in a forwarding table entry matches the target network tag and a destination address in the forwarding table entry matches the target destination address, the outbound interface recorded in the forwarding table entry may be taken as the target outbound interface, such that this target message may be forwarded out through the target outbound interface.

In an example of the present disclosure, obtaining a locally stored correspondence relationship of a network tag, a destination address and an outbound interface may comprise: obtaining the correspondence relationship between an outbound interface, and a network tag and a destination address according to inputted configuration information; or, obtaining the correspondence relationship between an outbound interface, and a network tag and a destination address according to a notification message sent by a host. Specifically, a user may configure a correspondence relationship of a destination address, a network tag and an outbound interface on the first edge device by inputting configuration information, so that the first edge device may determine the outbound interface of a target message based on this correspondence relationship. Wherein, the configuration information may specifically comprise parameter information such as a network tag, a destination address, and a corresponding interface tag of an outbound interface, which is used to configure the correspondence relationship of a destination address, a network tag and an outbound interface. This outbound interface is an interface on the first edge device, and may specifically comprise an interface through which the first edge device is connected to a host, and an interface through which the first edge device is connected to other edge devices, and the like. In an example, after detecting user inputted configuration information, the first edge device may extract parameter information carried by the configuration information, such as a network tag, a destination address, and a corresponding interface tag of an outbound interface, so that the correspondence relationship of a network tag, a destination address and an outbound interface is configured based on the network tag, the destination address, and the corresponding interface tag of the outbound interface.

Besides, the first edge device may further determine the correspondence relationship between an outbound interface, and a network tag and a destination address according to a notification message sent by a host, and may store the determined correspondence relationship locally. Wherein, the notification message may carry a host address and a network tag. The host address may be the MAC address, IP address or the like of the host sending the notification message, and the network tag may be a VLAN tag of the network to which the host sending the notification message belongs. The first edge device may take the interface through which the notification message is received as the outbound interface corresponding to the host, and take the host address carried in the notification message as the destination address, thereby it may construct and locally store the correspondence relationship of the destination address, the network tag and an outbound interface for the notification message.

In an example, obtaining the correspondence relationship between an outbound interface, and a network tag and a destination address according to a notification message sent by a host comprises: receiving a notification message sent by a host, and taking the interface through which the notification message is received as the outbound interface, and recording the correspondence relationship between the outbound interface, and the destination address and the network tag carried in the notification message.

In conjunction with the above specific example, the first edge device may store the correspondence relationship between the destination address and the network tag and the outbound interface in a forwarding table entry. After receiving a notification message sent by a host, the first edge device may generate a corresponding forwarding table entry based on this notification message. Wherein, the forwarding table entry contains a host address and a network tag carried in the notification message. Specifically, after the host is online, a notification message carrying a host address and a network tag may be sent in a broadcast mode so as to access a VXLAN. Wherein, the host address may be used to determine the host sending the notification message, such as a MAC address, an IP address or the like; the network tag may be used to determine a VLAN to which the host sending the notification message belongs, such as a VLAN tag. After receiving this notification message, the first edge device of the VXLAN may parse out the host address and the network tag carried in the notification message by analyzing the notification message, thus it may generate a corresponding forwarding table entry based on the host address and the network tag carried in the notification message as well as the interface through which the notification message is received. The forwarding table entry may include parameters such as the host address and the network tag, interface data and the like, which is not limited in the examples of the present disclosure.

After generating a forwarding table entry, the first edge device may store the generated forwarding table entry for subsequent data processing, for example, forwarding a service message based on the stored forwarding table entry. Specifically, after receiving a service message, the first edge device may match the target destination address carried in the service message with the host address in the forwarding table entry, and match the target network tag carried in the service message with the network tag in the forwarding table entry. If the host address in the forwarding table entry matches the target destination address, and network tag in the forwarding table entry matches the target network tag, a target outbound interface corresponding to the service message can be determined based on interface data in the forwarding table entry so as to forward the service message through the target outbound interface.

In conclusion, after a host is online, the first edge device of a VXLAN may generate a forwarding table entry based on a notification message sent by the host. The forwarding table entry contains the host address and the network tag carried in the notification message. The first edge device may forward a service message based on the host address and the network tag in the forwarding table entry. That is to say, when a service message is received from a host, the service message is forwarded by matching both the target destination address and the target network tag with the host address and the network tag in the forwarding table entry, avoiding the situation that the service message is forwarded as long as the host address is hit, for example the situation that the service message is forwarded through an interface in a MAC table when the MAC address is hit in original VXLAN Layer 2 forwarding, thereby solving the problem that multiple VMs with the same MAC address but belonging to different VLANs cannot gain access to the same VXLAN.

Actually, the first edge device of a VXLAN may be connected to multiple hosts, and generate and store a forwarding table entry corresponding to each online host based on a notification message sent by each online host, and thereby forward service messages of each host based on the forwarding table entry corresponding to each host. In an example, the data processing method applicable to the first edge device of a VXLAN may further comprise: storing a forwarding table entry of each host so as to generate an address forwarding table. When receiving a service message, the first edge device of a VXLAN may determine a forwarding table entry corresponding to the service message by searching the address forwarding table generated in advance, and thus forward the service message out through a target outbound interface corresponding to interface data in the forwarding table entry.

In an example of the present disclosure, the first edge device may generate a first message based on a host address and a network tag carried in a notification message sent by a host, and send the first message to other edge devices, so that other edge devices may record, based on the first message, the correspondence relationship of the outbound interface and the network tag and the host address carried in the first message. Similarly, the first edge device may further record the correspondence relationship between a network tag and a host address carried in a first message based on the first message sent by other edge devices. Thus, in an example of the present disclosure, the data processing method may further comprise: sending, after the correspondence relationship of a network tag, a destination address and an outbound interface is obtained, the destination address and the network tag in the correspondence relationship to a third edge device.

In an example of the present disclosure, the third edge device may be used to characterize other edge devices connected to the first edge device, for example which may comprise the second edge device. In an example, obtaining the correspondence relationship of a network tag, a destination address and an outbound interface according to a notification message sent by a host may specifically comprise: receiving a first message, sent by a second edge device, that carries the destination address and the network tag, and taking the interface through which the first message is received as the outbound interface, and recording the correspondence relationship of the outbound interface, the destination address and the network tag carried in the first message; wherein, the destination address and the network tag carried in the first message are obtained by the second edge device according to the notification message sent by the host.

Figure 2:
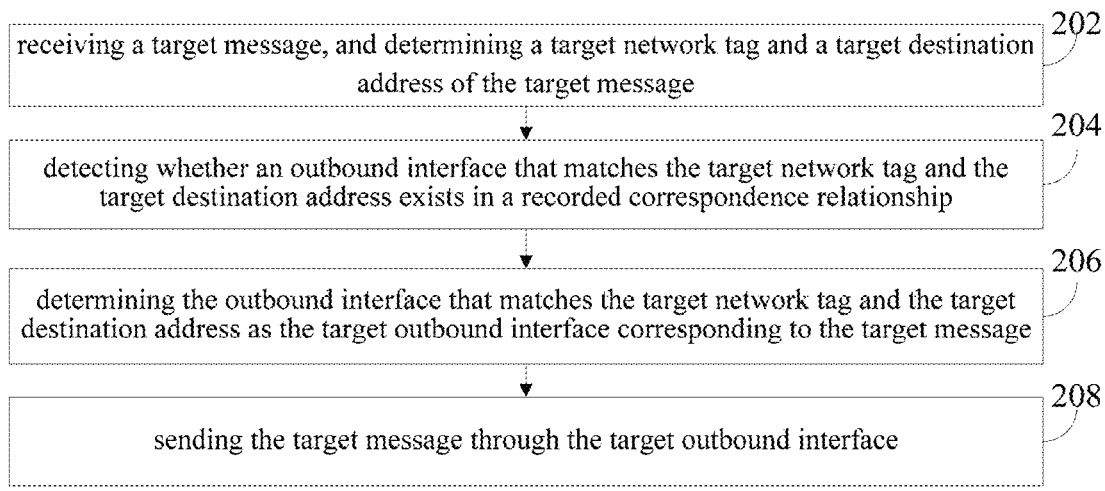
FIG. 2 is a flowchart of steps of another data processing method provided by an example of the present disclosure.

Refer to FIG. 2, which is a flowchart of steps of another data processing method provided by an example of the present disclosure. The data processing method may specifically comprise the following steps:

Block 202, receiving a target message, and determining a target network tag and a target destination address of the target message.

In an example of the present disclosure, a target message may carry parameter information such as a target destination address, a source host address. Wherein, the target destination address may be used to characterize an address that the target message needs to access, and the source host address may be used to characterize a source address where the target message is sent. After receiving the target message, the first edge device may analyze the target message to obtain a target destination address carried in the target message, i.e., to determine the target destination address of the target message. The first edge device may further determine a first network tag corresponding to the target message based on an interface through which the target message is received, and thus take the first network tag corresponding to the target message as a target network tag. The first network tag may be used to identify a VLAN to which the address of a host sending the target message belongs. For example, the first network tag may be a network tag corresponding to the interface through which the target message is received.

In an example, the target message may carry a second network tag, which may be used to identify a VLAN that the target message needs to access. In an example of the present disclosure, if the first network tag corresponding to the target message is inconsistent with the second network tag that the target message needs to access, then judge whether a mapping relationship between the first network tag and the second network tag exists, if it does, then the second network tag can be taken as the target network tag; otherwise, the mapping relationship between the first network tag and the second network tag may be established, and the second network tag may be taken as the target network tag. In an example, if a mapping relationship between this source host address, the interface through which the target message is received and the network tag is locally stored, the first edge device may search for the locally cached mapping relationship based on the source host address carried in the target message and the interface through which the target message is received, so as to determine the network tag having a mapping relationship with the source host address and the interface through which the target message is received as the second network tag corresponding to the target message.

Block 204, detecting whether an outbound interface that matches the target network tag and the target destination address exists in a recorded correspondence relationship.

When forwarding a target message, the first edge device may determine whether the target message can be forwarded by detecting whether an outbound interface that matches the target network tag and the target destination address exists in the recorded correspondence relationship of a network tag, a destination address and an outbound interface. If it does, block 206 may be executed; otherwise, the target message may not be sent. In an example, the target message can be discarded, which is not limited in the examples of the present disclosure.

In an example of the present disclosure, if the destination address included in one correspondence relationship matches the target destination address and the network tag included in the correspondence relationship matches the target network tag, then it is determined that the outbound interface included in the correspondence relationship matches the target network tag and the target destination address.

Block 206, determining the outbound interface that matches the target network tag and the target destination address as the target outbound interface corresponding to the target message.

Block 208, sending the target message through the target outbound interface.

After determining the target outbound interface, the first edge device may forward the target message through the target outbound interface.

In a specific application of an example of the present disclosure, when receiving a notification message, the first edge device of a VXLAN may extract a host address and a network tag from the received notification message, and may determine the corresponding interface data based on an interface through which the notification message is received, so that a corresponding forwarding table entry may be generated using the interface data, the host address and the network tag. For example, after a VM hanging under a VTEP is online, and after the VM reports an Address Resolution Protocol (ARP) message, a MAC forwarding table entry may be formed on the VTEP.

Here, the MAC forwarding table entry is a table entry in a MAC table, and the MAC table is an address forwarding table.

Figure 3:
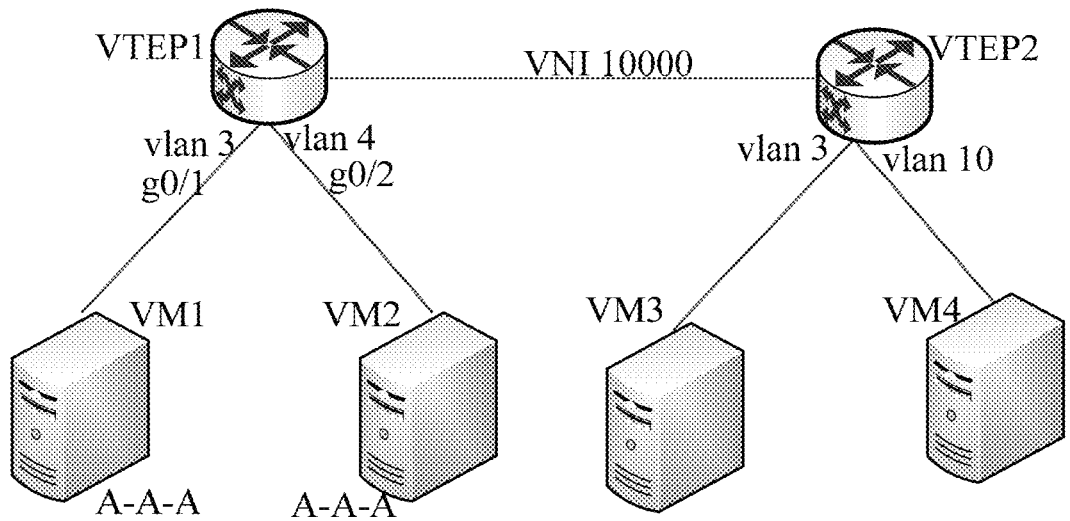
FIG. 3 is a schematic diagram of VMs belonging to different VLANs accessing to one VXLAN in an example of the present disclosure.

Specifically, in a schematic diagram of VMs belonging to different VLANs accessing to one VXLAN in a specific example as shown in FIG. 3, when VM1 and VM2 hanging under VTEP1 are online, VTEP1 may generate a forwarding table entry corresponding to VM1 based on a notification message sent by VM1, and may generate a forwarding table entry corresponding to VM2 based on a notification message sent by VM2, as shown in Table 1. Wherein, the table entry in the second row of table 1 is a forwarding table entry corresponding to VM1, and the table entry in the third row of table 1 is a forwarding table entry corresponding to VM2.

TABLE 1

| destination MAC | vlan tag | vsi vni | Interface |
| --- | --- | --- | --- |
| A-A-A | 3 | 10000 | g0/1 |
| A-A-A | 4 | 10000 | g0/2 |

In Table 1, the destination MAC may be used to characterize a host address of a VM; the vlan tag may be used to characterize the VLAN to which the VM accesses; the vsi vni may be used to identify a VXLAN; the interface may be used to characterize the corresponding outbound interface of a VM, i.e., an outbound interface through which the VTEP may receive or forward messages of this VM, for example, receive a notification message of this VM, forward to this VM a service message that accesses this VM, and receive messages that this VM accesses messages of other VMs, and the like.

It should be noted that, VXLAN may be identified through VXLAN Identification (VXLAN ID), and the VXLAN ID may be referred to as a VXLAN network identifier (VNI).

After receiving a service message, the first edge device of a VXLAN may extract a target destination address and a target network tag carried therein from this service message, and thus may search an address forwarding table based on the extracted target destination address and the target network tag, so as to determine a corresponding target forwarding table entry. During the search, whether a network tag and a host address of each forwarding table entry in the address forwarding table match with the target network tag and the target destination address may be detected. If it is detected that a network tag in a certain forwarding table entry matches the target network tag and a host address in the forwarding table entry matches the target destination address, the forwarding table entry may be determined as a target forwarding table entry corresponding to the service message. After determining the target forwarding table entry, the first edge device of a VXLAN may determine a target outbound interface based on interface data in the target forwarding table entry, so as to forward the service message out through the target outbound interface.

In an example of the present disclosure, by expanding the hit index of the forwarding table entries in edge devices of a VXLAN, the edge devices of the VXLAN meet the requirement that different VLANs need to support the same host address. Specifically, in original VXLAN Layer 2 forwarding, forwarding is performed based on interface data in a MAC table as long as the MAC address is hit. While in an example of the present disclosure, hit index of VXLAN Layer 2 forwarding are modified, so that a service message is forwarded when a host address and VLAN are hit. That is, the concept of forwarding based on both VLAN and MAC addresses is proposed, thus solving the problem that VMs with the same MAC address but belonging to different VLANs cannot gain access to one VXLAN at the same time.

In an example, after generating an address forwarding table, the first edge device of a VXLAN may synchronize forwarding information recorded in the address forwarding table to a neighboring device, so that the neighboring device may update based on the synchronized forwarding information. In an example, the first edge device of a VXLAN may extract various network tags corresponding to the same host address from the address forwarding table, use the extracted various network tags to generate corresponding routing messages, and send the routing messages to a neighboring device so that the neighboring device updates the address forwarding table in the neighboring device based on the routing messages.

The routing message may include a plurality of fields, so as to carry various parameter information, and may specifically comprise a MAC address field, a VLAN tag field, a Multi-Protocol Label Switching (MPLS) Label field, and the like. Wherein, the MAC address field may be used for filling a host address, and the VLAN tag field may be used for filling a network tag corresponding to the host address; the MPLS Label field may be used for filling a MPLS Label, for example may be used for filling vsi vni.

The first edge device of a VXLAN is illustrated as an example of VTEP.

After generating a routing message, VTEP may send the routing message to a remote VTEP through a VXLAN tunnel. After receiving the routing message, the remote VTEP may analyze the routing message to obtain a host address carried in the routing message, and a network tag corresponding to the host address and MPLS Label, and update the address forwarding table saved by the remote VTEP.

In an example of the present disclosure, the routing message may further comprise a reserved extension field to carry other parameter information, e.g. a network tag corresponding to a network layer, which is not limited in the examples of the present disclosure.

As shown in FIG. 3, as a specific example of the present disclosure, after generating a MAC forwarding table, VTEP1 may synchronize information recorded in the MAC forwarding table to all EVPN neighboring device of Border Gateway Protocol (BGP), e.g., VTEP2 as shown in FIG. 3.

Specifically, after generating a MAC address forwarding table, as shown in the above Table 1, VTEP1 may extract network tags corresponding to a host address "A-A-A" from this MAC address forwarding table, i.e., extract network tags which are vlan tag "3" and vlan tag "4", and may generate a vlan tag list based on the extracted network tags, and may fill an added VLAN tag in an accessibility message with the vlan tag list, so as to generate a corresponding routing message, for example generate an EVPN2 MAC routing message; thus the generated EVPN2 MAC routing message may be sent through a VXLAN tunnel to VTEP2.

After receiving this EVPN2 MAC routing message, VTEP 2 may analyze this routing message and find that the MAC address field is followed by an added field (i.e., a VLAN tag field) corresponding to the vlan tag list, so that it can be determined that the host address "A-A-A" is from different VLANs based on parameters carried by the MAC address field and the VLAN tag field, and a MAC forwarding table entry synchronized at a corresponding remote end may be newly established, as shown in Table 2. Wherein, the tunnel 0 may be used for determining a point-to-point logic tunnel between VTEP 2 and VTEP1.

TABLE 2

| destination MAC | vlan tag | vsi vni | interface |
| --- | --- | --- | --- |
| A-A-A | 3 | 10000 | tunnel 0 |
| A-A-A | 4 | 10000 | tunnel 0 |

In an example of the present disclosure, a VLAN tag field is added in an accessibility message by means of expanding type 2 MAC routing of EVPN, thus a network tag corresponding to the same host address may be filled in the added VLAN tag field to generate an EVPN synchronization routing message, so that the neighboring device of the first edge device of the VXLAN may generate a MAC forwarding table entry based on a MAC address and a VLAN tag carried in the EVPN synchronization routing message, so as to forward a service message of the host based on the MAC forwarding table entry.

In an example of the present disclosure, when the first edge device of a VXLAN performs VXLAN message encapsulation, a VLAN tag required for an opposite-end Access Controller (AC) may be carried in a reserved field of the VXLAN header, so as to forward a service message with different VLANs and the same MAC.

Figure 4:
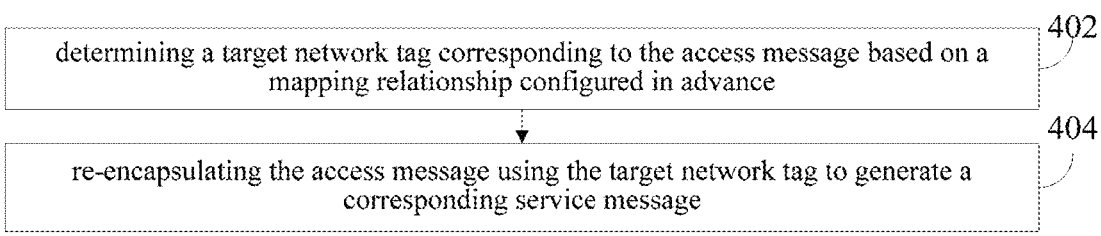
FIG. 4 is a flowchart of steps of one edge device re-encapsulating an access message sent by a host provided by an example of the present disclosure.

Refer to FIG. 4, which shows a flowchart of steps of one edge device re-encapsulating an access message sent by a host provided by an example of the present disclosure. The following steps may be specifically comprised:

Block 402, determining a target network tag corresponding to the access message based on a mapping relationship configured in advance.

Wherein, the access message may be used to access a target host, for example an access message generated for a target host by an online host hanging under a first edge device. The target network tag may be used to determine a VLAN to which the target host belongs.

Block 404: re-encapsulating the access message using the target network tag to generate a corresponding service message.

Specifically, in an example of the present disclosure, a concept of encapsulating a VLAN tag by a VXLAN is added, so that when VXLAN encapsulation is performed on a VTEP for an access message, the mapped VLAN tag is encapsulated together with a reserved field in a VXLAN header based on a default mapping relationship or a manually modified mapping relationship so as to generate a corresponding service message, so that the service message carrying the VLAN tag is forwarded to a VTEP accessed by a target host.

For example, there are two reserved fields in a VXLAN header at present, which are denoted as Reserved1 and Reserved2 respectively, and any of which may be selected to carry the value of a VLAN tag. For example, the value of a VLAN tag may be carried in Reserved1, and the value of a VLAN tag may also be carried in Reserved2, which is not limited in the examples of the present disclosure.

As shown in FIG. 3, as a specific example of the present disclosure, if VM3 in FIG. 3 wants to access VM1, during VXLAN encapsulation on VTEP 2, a target network tag of VLAN tag 3 may be encapsulated into a reserved field in a VXLAN header according to a mapping relationship configured in advance, i.e., the VLAN tag carried in the VXLAN header that is VXLAN-encapsulated is 3, so that a service message is generated. When the service message reaches VTEP1, VTEP1 may perform VXLAN decapsulation of the service message. During the decapsulation, VTEP1 may discover that the VLAN tag is carried in the VXLAN header, so that it may be determined that the VLAN tag also needs to be hit in addition to the need of hitting the MAC address when matching a MAC table. In this way, VTEP1 may determine that the outbound interface corresponding to the service message is g0/1 after the hitting, based on the forwarding table entry in the above table 1, so as to forward the service message to VM1 through the outbound interface g0/1, thereby completing service forwarding between VM3 and VM1.

In an example of the present disclosure, the configuration method of a mapping relationship may specifically comprise: establishing a mapping relationship between an online host and a network tag of a VLAN to which the online host belongs by detecting the VLAN to which the online host belongs; and/or establishing a mapping relationship between an online host and a network tag in mapping information when it is detected that the mapping information has been inputted for the online host.

In a specific application in an example of the present disclosure, the VLAN tag accessed by a host hanging under a VTEP may be matched with a network tag in an address forwarding table, so as to determine the VLAN tag that a service message needs to encapsulate. For example, in FIG. 3, in which it is VM3 with a VLAN tag of 3 that is being accessed, if VM3 wants to access A-A-A, it accesses by default the first A-A-A with a VLAN tag of 3 in the above table 2, i.e., it may access VM1 with a VLAN tag of 3. If a user on VTEP2 may perform manual intervention to map the access of VLAN tag 3 in the AC of VTEP2 to VLAN tag 4, then VM3 may access VM2 with a VLAN tag of 4.

Similarly, VM4 in FIG. 3 may also access VM1 or VM2 through manual mapping. Specifically, when detecting that mapping information inputted by an online host VM4, VTEP2 may establish a mapping relationship between the online host VM4 and a network tag in the mapping information. For example, when the VLAN tag in the mapping information is 3, a mapping relationship between VM4 and VLAN tag 3 is established such that VM4 may access VM1; alternatively, when the VLAN tag in the mapping information is 4, a mapping relationship between VM4 and VLAN tag 4 is established such that VM4 may access VM2.

VXLAN is normally applied to a data center network. In an example of the present disclosure, by extending EVPN Type 2 routing, when synchronizing and forwarding Layer 2 forwarding information between data centers, all the Layer 2 services inside the current data center may be mapped onto a mapping VNI between two data centers, thereby saving the resources of VXLAN services on edge devices.

In the examples of the present disclosure, the examples of a method are expressed as a series of action combinations for simplicity of description, but a person skilled in the art should know that the examples of the present disclosure are not limited by the sequences of actions described, since some steps may be performed in other orders or simultaneously according to the examples of the present disclosure. Secondly, a person skilled in the art should also appreciate that all the examples described in the specification belong to preferred examples, and the actions involved are not necessarily required by the examples of the present disclosure.

Figure 5:
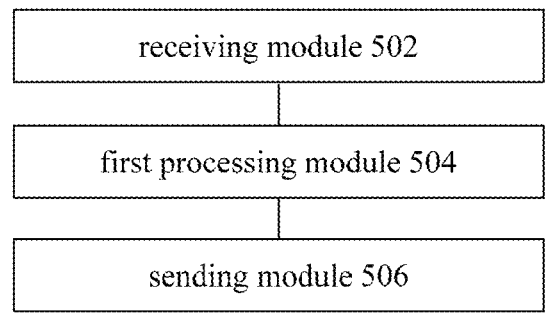
FIG. 5 is a structural block diagram of a data processing device provided by an example of the present disclosure.

Refer to FIG. 5, which is a structural block diagram of a data processing device provided by an example of the present disclosure.

The data processing device provided by the example of the present disclosure is applicable to a first edge device of a VXLAN, and may specifically comprise the following modules:

a receiving module 502, used for receiving a target message, and determining a target network tag and a target destination address of the target message;

a first processing module 504, used for determining a target outbound interface corresponding to the target message based on a result of matching the target network tag and the target destination address with a locally stored correspondence relationship of a network tag, a destination address and an outbound interface;

a sending module 506, used for sending the target message through the target outbound interface.

Figure 6:
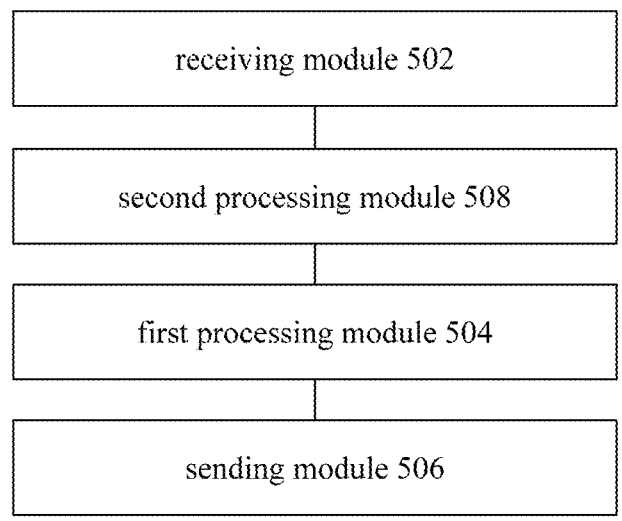
FIG. 6 is a structural block diagram of another data processing device provided by an example of the present disclosure.

Refer to FIG. 6, which is a structural block diagram of another data processing device provided by an example of the present disclosure.

In an example of the present disclosure, the data processing device may further comprise a second processing module 508.

The second processing module 508, which may be used for obtaining the correspondence relationship between an outbound interface, and a network tag and a destination address according to inputted configuration information; or, obtaining the correspondence relationship between an outbound interface, and a network tag and a destination address according to a notification message sent by a host.

In an example, the second processing module 508 may be specifically used for receiving a notification message sent by a host, and taking the interface through which the notification message is received as the outbound interface, and recording the correspondence relationship between the outbound interface, and the destination address and the network tag carried in the notification message; or, the second processing module 508 may be specifically used for receiving a first message, sent by a second edge device, that carries the destination address and the network tag, taking the interface through which the first message is received as the outbound interface, and recording the correspondence relationship between the outbound interface, and the destination address and the network tag carried in the first message, wherein, the destination address and the network tag carried in the first message are obtained by the second edge device according to a notification message sent by a host.

In an example of the present disclosure, the sending module 506 is further used for, after the first edge device obtains the correspondence relationship of an outbound interface, a destination address and a network tag by the second processing module 508, sending the destination address and the network tag in the correspondence relationship to a third edge device.

In an example of the present disclosure, the receiving module 502 is specifically used for, after receiving the target message, taking a first destination address carried in the target message as the target destination address, and taking a first network tag corresponding to the target message as the target network tag.

In an example, the receiving module 502 may be further used for, if the first network tag corresponding to the target message is inconsistent with a second network tag to be accessed by the target message, judging whether a mapping relationship between the first network tag and the second network tag exists, if it does, taking the second network tag as the target network tag.

In an example of the present disclosure, the first processing module 504 may be specifically used for detecting whether an outbound interface that matches the target network tag and the target destination address exists in the recorded correspondence relationship, and if it does, determining the outbound interface that matches the target network tag and the target destination address as a target outbound interface.

With the application of the example of the present disclosure, after receiving a target message, a first edge device of a VXLAN may match the destination address and the network tag in a locally stored correspondence relationship with the target destination address and the target network tag carried in the target message so as to determine a target outbound interface for sending the target message through the target outbound interface. That is to say, when a service message is received, the service message is forwarded by matching the destination address and the network tag, avoiding the prior situation in which the service message is forwarded as long as the destination address is hit, for example the prior situation in VXLAN Layer 2 forwarding in which the service message is forwarded based on interfaces in a MAC table as long as the destination address is hit, thereby solving the problem that multiple VMs with the same MAC address but belonging to different VLANs cannot gain access to the same VXLAN.

Figure 7:
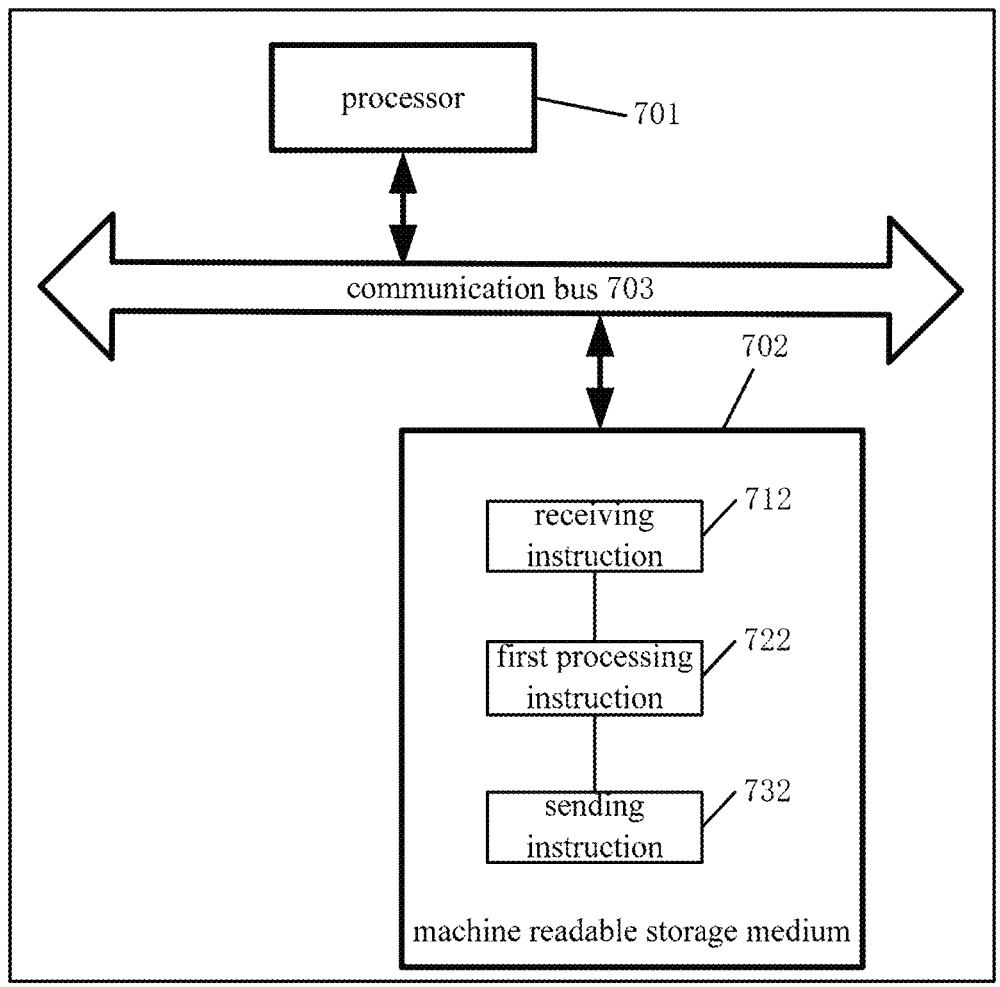
FIG. 7 is a structural block diagram of an electronic device provided by an example of the present disclosure.

Corresponding to the examples of the data processing method described above, examples of the present disclosure further provide an electronic device. The electronic device may serve as a first edge device of a VXLAN. Refer to FIG. 7, which shows a structural block diagram of an electronic device provided by an example of the present disclosure. The electronic device comprises a processor 701 and a machine readable storage medium 702. The machine readable storage medium 702 stores machine executable instructions which can be executed by the processor 701. The machine executable instructions may comprise a receiving instruction 712, a first processing instruction 722, and a sending instruction 732;

the receiving instruction 712 is executed by the processor 701 to receive a target message, and determine a target network tag and a target destination address of the target message;

the first processing instruction 722 is executed by the processor 701 to determine a target outbound interface corresponding to the target message based on a result of matching the target network tag and the target destination address with a locally stored correspondence relationship of a network tag, a destination address and an outbound interface;

the sending instruction 732 is executed by the processor 701 to send the target message through the target outbound interface.

In an example of the present disclosure, the machine executable instructions may further comprise a second processing instruction;

the second processing instruction is executed by the processor 701 to obtain the correspondence relationship between an outbound interface, and a network tag and a destination address according to inputted configuration information; or, to obtain the correspondence relationship between an outbound interface, and a network tag and a destination address according to a notification message sent by a host.

In an example of the present disclosure, the second processing instruction is executed by the processor 701 specifically to receive a notification message sent by a host, and take the interface through which the notification message is received as the outbound interface, and record the correspondence relationship between the outbound interface, and the destination address and the network tag carried in the notification message;

or, receive a first message, sent by a second edge device, that carries a destination address and a network tag, and take the interface through which the first message is received as the outbound interface, and record the correspondence relationship between the outbound interface, and the destination address and the network tag carried in the first message; wherein, the destination address and the network tag carried in the first message are obtained by the second edge device according to a notification message sent by a host.

In an example of the present disclosure, the sending instruction 732 is executed by the processor 701 specifically to send, after the first edge device obtains the correspondence relationship of an outbound interface, a destination address and a network tag by the second processing instruction, the destination address and the network tag in the correspondence relationship to a third edge device.

In an example of the present disclosure, the receiving instruction 712 is executed by the processor 701 specifically to take a first destination address carried in the target message as the target destination address, and take a first network tag corresponding to the target message as the target network tag after receiving the target message.

In an example of the present disclosure, the receiving instruction 712 is executed by the processor 701 specifically to judge, if the first network tag corresponding to the target message is inconsistent with a second network tag to be accessed by the target message, whether a mapping relationship between the first network tag and the second network tag exists, if it does, take the second network tag as the target network tag.

In an example of the present disclosure, the first processing instruction 722 is executed by the processor 701 specifically to detect whether an outbound interface that matches the target network tag and the target destination address exists in a recorded correspondence relationship, and if it does, determine the outbound interface that matches the target network tag and the target destination address as the target outbound interface.

With the application of the example of the present disclosure, after receiving a target message, a first edge device of a VXLAN may match the destination address and the network tag in a locally stored correspondence relationship with the target destination address and the target network tag carried in the target message so as to determine a target outbound interface for sending the target message through the target outbound interface. That is to say, when a service message is received, the service message is forwarded by matching the destination address and the network tag, avoiding the prior situation in which the service message is forwarded as long as the destination address is hit, for example the prior situation in VXLAN Layer 2 forwarding in which the service message is forwarded based on interfaces in a MAC table as long as the destination address is hit, thereby solving the problem that multiple VMs with the same MAC address but belonging to different VLANs cannot gain access to the same VXLAN.

As shown in FIG. 7, an electronic device may further comprise a communication bus 703, the processor 701 and the machine readable storage medium 702 being communicated with each other via the communication bus 703, which may be a Peripheral Component Interconnect (PCI) bus or an Extended Industry Standard Architecture (EISA) bus or the like. The communication bus 703 can be divided into an address bus, a data bus, and a control bus or the like.

The machine readable storage medium 702 may comprise a Random Access Memory (RAM), or may comprise a Non-Volatile Memory (NVM), such as at least one disk memory. In addition, the machine readable storage medium 702 may also be at least one storage device remote from the processor.

The processor 701 may be a general purpose processor, including a Central Processing Unit (CPU), a Network Processor (NP); may also be a Digital Signal Processing (DSP), an Application Specific Integrated Circuit (ASIC), a Field-Programmable Gate Array (FPGA) or another programmable logic device, discrete gate or transistor logic device, discrete hardware component.

Corresponding to the examples of the data processing method described above, examples of the present disclosure further provide a machine readable storage medium. The machine readable storage medium may be located on a first edge device of a VXLAN, and stores machine executable instructions, which comprise a receiving instruction, a first processing instruction, and a sending instruction;

the receiving instruction is invoked and executed by a processor to receive a target message, and determine a target network tag and a target destination address of the target message;

the first processing instruction is invoked and executed by the processor to determine a target outbound interface corresponding to the target message based on a result of matching the target network tag and the target destination address with a locally stored correspondence relationship of a network tag, a destination address and an outbound interface;

the sending instruction is invoked and executed by the processor to send the target message through the target outbound interface.

In an example of the present disclosure, the machine executable instructions further comprises a second processing instruction;

the second processing instruction is invoked and executed by the processor to obtain the correspondence relationship between an outbound interface, and a network tag and a destination address according to inputted configuration information; or, to obtain the correspondence relationship between an outbound interface, and a network tag and a destination address according to a notification message sent by a host.

In an example of the present disclosure, the second processing instruction is invoked and executed by the processor to receive a notification message sent by a host, and take the interface through which the notification message is received as the outbound interface, and record the correspondence relationship between the outbound interface, and the destination address and the network tag carried in the notification message.

receive a first message, sent by a second edge device, that carries a destination address and a network tag, and take the interface through which the first message is received as the outbound interface, and record the correspondence relationship between the outbound interface, and the destination address and the network tag carried in the first message; wherein, the destination address and the network tag carried in the first message are obtained by the second edge device according to a notification message sent by a host.

In an example of the present disclosure, the sending instruction is invoked and executed by the processor to send, after the first edge device obtains the correspondence relationship of an outbound interface, a destination address and a network tag by the second processing instruction, the destination address and the network tag in the correspondence relationship to a third edge device.

In an example of the present disclosure, the receiving instruction is invoked and executed by the processor specifically to take, after receiving the target message, a first destination address carried in the target message as the target destination address, and take a first network tag corresponding to the target message as the target network tag.

In an example of the present disclosure, the receiving instruction is invoked and executed by the processor to judge, if the first network tag corresponding to the target message is inconsistent with a second network tag to be accessed by the target message, whether a mapping relationship between the first network tag and the second network tag exists, if it does, take the second network tag as the target network tag.

In an example of the present disclosure, the first processing instruction is invoked and executed by the processor to detect whether an outbound interface that matches the target network tag and the target destination address exists in the recorded correspondence relationship, if it does, determine the outbound interface that matches the target network tag and the target destination address as the target outbound interface.

With the application of examples of the present disclosure, after receiving a target message, a first edge device of a VXLAN may match the destination address and the network tag in a locally stored correspondence relationship with the target destination address and the target network tag carried in the target message so as to determine a target outbound interface for sending the target message through the target outbound interface. That is to say, when a service message is received, the service message is forwarded by matching the destination address and the network tag, avoiding the prior situation in which the service message is forwarded as long as the destination address is hit, for example the prior situation in VXLAN Layer 2 forwarding in which the service message is forwarded based on interfaces in a MAC table as long as the destination address is hit, thereby solving the problem that multiple VMs with the same MAC address but belonging to different VLANs cannot gain access to the same VXLAN.

For the examples of a data processing device, an electronic device, a machine readable storage medium, brief description is made since they are substantially similar to the examples of a data processing method, and for the correlated part, reference can be made to the description with respect to the part of the examples of the data processing method.

Various examples in the specification are described in a progressive manner, and the parts emphasized for each example are the differences to other examples, thus same or similar parts between various examples can be referred to one another.

It will be understood by those skilled in the art that examples of the present disclosure may be provided as a method, an apparatus, or a computer program product. Thus, examples of the present disclosure may take the form of a hardware-only example, a software-only example, or an example of a combination of software and hardware. Moreover, examples of the present disclosure may take the form of computer program products implemented on one or more computer-usable storage media (including but not limited to disk storages, CD-ROMs, optical memories, etc.) containing computer program codes.

Examples of the present disclosure are described with reference to flowcharts and/or block diagrams of methods, terminal device (systems) and computer program products according to the examples of the present disclosure. It should be understood that each of the flows and/or blocks in the flowcharts and/or block diagrams, as well as a combination of the flows and/or blocks in the flowcharts and/or block diagrams, may be implemented by computer program instructions. These computer program instructions may be provided to a processor of a general purpose computer, a dedicated computer, an embedded processor, or other programmable data processing terminal device to generate a machine, such that devices for implementing the functions specified in one or more flows in the flowcharts and/or specified in one or more blocks in the block diagrams are generated via instructions executed by a processor of a computer or other programmable data processing terminal device.

These computer program instructions may also be stored on a computer readable memory capable of operating a computer or other programmable data processing terminal device in a particular manner such that instructions stored on the computer readable memory produce a manufacturing product comprising an instruction device, the instruction device implements the functions specified in one or more flows in the flowcharts and/or specified in one or more blocks in the block diagrams.

These computer program instructions may also be loaded onto a computer or other programmable data processing terminal device such that a series of operational steps are performed on the computer or other programmable terminal device to generate computer-implemented processes. Thus, the instructions executed on the computer or other programmable terminal device provide the steps of implementing functions specified in one or more flows in the flowcharts and/or specified in one or more blocks in the block diagrams.

While preferable examples of the present disclosure have been described, those skilled in the art will be able to make further changes and modifications to these examples upon the knowledge of the basic inventive concepts. Therefore, the appended claims are intended to be construed as including the preferable examples and all alternatives and modification within the scope of the examples of the present disclosure.

Finally, it should be noted that, the relationship terms herein such as "first", "second" and the like, if any, are only used for distinguishing one entity or operation from another entity or operation, but do not necessarily require or imply that there is actual relationship or order between these entities or operations. Moreover, the terms "include", "comprise" or any variants thereof are intended to cover a non-exclusive inclusion, so that processes, methods, articles, or terminal device comprising a series of elements comprise not only those elements listed but also those not specifically listed or elements intrinsic to these processes, methods, articles, or terminal device. Without further limitations, elements defined by the sentences "comprise(s) a . . . " or "include(s) a . . . " do not exclude that there are other identical elements in the processes, methods, articles, or terminal device which comprise these elements.

The invention claimed is:

1. A data processing method, applicable to a first edge device of a virtual extensible local area network, the method comprising:

receiving a target message, and determining a target network tag and a target destination address of the target message, wherein the network tag includes a VLAN tag;

determining a target outbound interface corresponding to the target message based on a result of matching the target network tag and the target destination address with a locally stored correspondence relationship of a network tag, a destination address and an outbound interface; and sending the target message through the target outbound interface, wherein the locally stored correspondence relationship of a network tag, a destination address and an outbound interface is obtained by obtaining the correspondence relationship between an outbound interface, and a network tag and a destination address according to a notification message sent by a host, wherein, obtaining the correspondence relationship between an outbound interface, and a network tag and a destination address according to the notification message sent by the host comprises:

receiving the notification message sent by the host, taking an interface through which the notification message is received as the outbound interface, and recording the correspondence relationship between the outbound interface, and the destination address and the network tag carried in the notification message; or, receiving a first message, sent by a second edge device, that carries a destination address and a network tag, and taking an interface through which the first message is received as the outbound interface, and recording the correspondence relationship between the outbound interface, and the destination address and the network tag carried in the first message, wherein, the destination address and the network tag carried in the first message are obtained by the second edge device according to the notification message sent by the host.

2. The method according to claim 1, wherein, the locally stored correspondence relationship of a network tag, a destination address and an outbound interface is obtained by the following step:

obtaining the correspondence relationship between an outbound interface, and a network tag and a destination address according to inputted configuration information.

3. The method according to claim 2, wherein, after the first edge device obtains the correspondence relationship of an outbound interface, a destination address and a network tag, the method further comprises: sending the destination address and the network tag in the correspondence relationship to a third edge device.

4. The method according to claim 1, wherein, determining a target network tag and a target destination address of the target message comprises:
after receiving the target message, taking a first destination address carried in the target message as the target destination address, and taking a first network tag corresponding to the target message as the target network tag.

5. The method according to claim 4, wherein, determining a target network tag of the target message further comprises:
if the first network tag corresponding to the target message is inconsistent with a second network tag to be accessed by the target message, judging whether a mapping relationship between the first network tag and the second network tag exists, and if it does, taking the second network tag as the target network tag.

6. The method according to claim 1, wherein, determining the target outbound interface corresponding to the target message based on the result of matching the target network tag and the target destination address with the locally stored correspondence relationship of a network tag, a destination address and an outbound interface comprises:
detecting whether an outbound interface that matches the target network tag and the target destination address exists in a recorded correspondence relationship, and if it does, determining the outbound interface that matches the target network tag and the target destination address as the target outbound interface.

7. An electronic device, comprising a processor and a machine readable storage medium that stores machine executable instructions executable by the processor, the machine executable instructions comprising a receiving instruction, a first processing instruction, and a sending instruction, wherein
the receiving instruction is executed by the processor to receive a target message, and determine a target network tag and a target destination address of the target message, wherein the network tag includes a VLAN tag;
the first processing instruction is executed by the processor to determine a target outbound interface corresponding to the target message based on a result of matching the target network tag and the target destination address with a locally stored correspondence relationship of a network tag, a destination address and an outbound interface; and
the sending instruction is executed by the processor to send the target message through the target outbound interface,
wherein, the machine executable instructions further comprise a second processing instruction; the second processing instruction is executed by the processor to obtain the correspondence relationship between an outbound interface, and a network tag and a destination address according to a notification message sent by a host, wherein, the second processing instruction is executed by the processor to:
receive the notification message sent by the host, and take an interface through which the notification message is received as the outbound interface, and record the correspondence relationship between the outbound interface, and the destination address and the network tag carried in the notification message; or,
receive a first message, sent by a second edge device, that carries a destination address and a network tag, and take an interface through which the first message is received as the outbound interface, and record the correspondence relationship between the outbound interface, and the destination address and the network tag carried in the first message, wherein, the destination address and the network tag carried in the first message are obtained by the second edge device according to a notification message sent by a host.

8. The electronic device according to claim 7, wherein the second processing instruction is executed by the processor
to obtain the correspondence relationship between an outbound interface, and a network tag and a destination address according to inputted configuration information.

9. The electronic device according to claim 8, wherein, the sending instruction is executed by the processor to send, after the first edge device obtains the correspondence relationship of an outbound interface, a destination address and a network tag by the second processing instruction, the destination address and the network tag in the correspondence relationship to a third edge device.

10. The electronic device according to claim 7, wherein, the receiving instruction is executed by the processor to take, after receiving the target message, a first destination address carried in the target message as the target destination address, and take a first network tag corresponding to the target message as the target network tag.

11. The electronic device according to claim 10, wherein, the receiving instruction is executed by the processor to judge, if the first network tag corresponding to the target message is inconsistent with a second network tag to be accessed by the target message, whether a mapping relationship between the first network tag and the second network tag exists, and if it does, take the second network tag as the target network tag.

12. The electronic device according to claim 7, wherein, the first processing instruction is executed by the processor to detect whether an outbound interface that matches the target network tag and the target destination address exists in a recorded correspondence relationship, and if it does, determine the outbound interface that matches the target network tag and the target destination address as the target outbound interface.

13. A non-transitory machine readable storage medium that stores machine executable instructions, the machine executable instructions comprising a receiving instruction, a first processing instruction, and a sending instruction; wherein
the receiving instruction is invoked and executed by a processor to receive a target message, and determine a target network tag and a target destination address of the target message, wherein the network tag includes a VLAN tag;
the first processing instruction is invoked and executed by the processor to determine a target outbound interface corresponding to the target message based on a result of matching the target network tag and the target destination address with a locally stored correspondence relationship of a network tag, a destination address and an outbound interface; and the sending instruction is invoked and executed by the processor to send the target message through the target outbound interface, wherein, the machine executable instructions further comprise a second processing instruction; the second processing instruction is executed by the processor to obtain the correspondence relationship between an outbound interface, and a network tag and a destination address according to a notification message sent by a host, wherein, the second processing instruction is executed by the processor to:

receive the notification message sent by the host, and take an interface through which the notification message is received as the outbound interface, and record the correspondence relationship between the outbound interface, and the destination address and the network tag carried in the notification message; or, receive a first message, sent by a second edge device, that carries a destination address and a network tag, and take an interface through which the first message is received as the outbound interface, and record the correspondence relationship between the outbound interface, and the destination address and the network tag carried in the first message, wherein, the destination address and the network tag carried in the first message are obtained by the second edge device according to the notification message sent by the host.

\* \* \* \* \*